United States Patent [19]

Giordano et al.

[11] 4,097,872

[45] Jun. 27, 1978

[54] AXIAL DROPLET ASPIRATOR

[75] Inventors: Francis Peter Giordano, Brooklyn; Ferdinand Hendriks, Yorktown Heights, both of N.Y.

[73] Assignee: International Business Machines Corporation, Armonk, N.Y.

[21] Appl. No.: 752,778

[22] Filed: Dec. 20, 1976

[51] Int. Cl.[2] .............................................. G01D 15/18

[52] U.S. Cl. ....................................... 346/75; 239/299

[58] Field of Search ...................... 346/75; 239/4, 102, 239/291, 299

[56] References Cited

U.S. PATENT DOCUMENTS

| | | | |
|---|---|---|---|
| 3,596,275 | 7/1971 | Sweet | 346/75 X |
| 3,972,051 | 7/1976 | Lundquist | 346/75 X |

OTHER PUBLICATIONS

Sweet, R. G.; High-Frequency Oscillography with Electrostatically Deflected Ink Jets; Stanford El. Labs, Stanford, Calif., Mar. 1964, only pp. 91–95.

*Primary Examiner*—Joseph W. Hartary
*Attorney, Agent, or Firm*—Jack M. Arnold

[57] ABSTRACT

There is described a droplet aspirator for an ink jet printer. The aspirator includes a housing having a tunnel therein, which is spaced from an ink jet nozzle which emits an ink jet stream which passes through the tunnel. A gas stream is also directed through the tunnel at substantially the same velocity as the ink jet stream for reducing the aerodynamic effects on adjacent ink droplets. The tunnels cross-sectional area is substantially constant from one plane to the next when measured in any given plane transverse to the longitudinal axis, for maintaining the velocity of the gas stream constant. The tunnel has a circular cross-section when used in a nozzle per spot system, and when used in an analog deflected system, has an entrance of one geometry, with the tunnel changing in geometry along its longitudinal axis to a different geometry at its exit. Preferably, in the analog deflected system, the entrance geometry is circular and the exit geometry is elliptical or rectangular.

25 Claims, 8 Drawing Figures

AXIAL DROPLET ASPIRATOR

BACKGROUND OF THE INVENTION

In an ink jet printing system, one of the primary causes of the misregistration of droplets on a printing medium is the interaction of droplets in flight. There are two causes for the droplet interaction, namely the charge on the droplets and the aerodynamic drag on the respective droplets.

The charge interaction and the aerodynamic interaction are generally never observed independently, and in most instances are closely related. Charge interaction would be less severe without the presence of aerodynamic drag. That is, the presence of aerodynamic drag magnifies the effect of charge interactions. In the absence of aerodynamic drag, the only distortions are of electrostatic origin, and thus one could consider whether it would be beneficial to print with a lower drop charge and a longer throw length to obtain the identical deflection for the two cases.

The repulsion of two equally charged drops, except for the very beginning of the interaction, is proportional to the drop charge times the throw length. For a given deflection voltage, one-fourth of the original charge is needed when the length over which the electric deflection field exists is doubled. Thus, the charge repulsion is halved, since it is proportional to the product of charge and deflection length.

Without some form of aspiration to compensate for aerodynamic drag, the benefits of an increased throw length are inaccessible due to aerodynamic distortions, e.g., drop merging, which would occur long before the double throw length is traversed.

The use of an aspirator relaxes the necessity to deflect droplets in a very short distance and substantially decouples the motion of droplets among each other. Accordingly, this makes the drop deflection a more linear function of the drop charge.

U.S. Pat. No. 3,562,757 of Bischoff, describes an ink jet system wherein charge interaction between adjacent droplets and aerodynamic drag is compensated for. The compensation comprises utilizing the "guard drop" principle in which every other droplet is charged, such that every other droplet is guttered thereby effecting an increase in distance between the droplets which are used for printing, thereby reducing the charge interactions between printing droplets as well as the wake between the droplets used for printing. In Bischoff there is no aspiration used, and the efficiency of the system is decreased due to the guttering of an excessive number of droplets.

The concept of utilizing a gas stream, such as air, to compensate for aerodynamic drag in an analog deflected ink jet system is set forth in U.S. Pat. No. 3,596,275 of Sweet. Sweet introduces a colinear stream of air with the ink droplet stream to reduce the effects of the wake of a given droplet relative to a following droplet, with the objective to remove the drag on each droplet. However, in Sweet the gas stream becomes turbulent before it matches the droplet velocity. In Sweet the ink jet nozzle is mounted on an airfoil like structure which is placed near the center of a windtunnel where the air stream has accelerated to near maximum velocity. Since, even a good airfoil has a small but unstable wake which is swept along with the ink droplets, the droplet trajectory of Sweet is affected by the wake and accordingly optimum minimization of aerodynamic distortion is not achieved.

U.S. Pat. No. 3,972,051 of Lundquist et al discloses an ink jet printing system which includes a laminar airflow passageway through which ink droplets are directed before striking a moving print medium. The airflow is created by suction at the downstream end of the passageway, with the airflow not being filtered before it enters the passageway. Accordingly, aerodynamic disturbance of the airflow might be created by the air passing over the charge electrode and deflection electrodes. The geometry of the entrance and exit apertures of the passageway is rectangular, with the passageway having a non-uniform cross-sectional area, with the laminar flow of the air having a non-constant velocity and being reduced in velocity as the airflow approaches the print medium. Here too, the air velocity is everywhere only a fraction of the droplet velocity to avoid turbulence.

None of the above-cited prior art discloses an aspirator for an ink jet system in which the aspirator includes a passageway, such as a tunnel, having a constant cross-sectional area, and in which the velocity of the airflow therethrough is substantially constant and equal to the ink droplet velocity such that the aerodynamic drag, if any, on the droplets is substantially eliminated.

SUMMARY OF THE INVENTION

According to the present invention an aspirator for an ink jet printer comprises a tunnel having a cross-sectional area which is substantially constant from one plane to the next when measured in any given plane transverse to the longitudinal axis. The tunnel has a circular cross-section from entrance to exit, or has an entrance of one geometry with the tunnel changing in geometry along its longitudinal axis to a different geometry at its exit.

DETAILED DESCRIPTION OF THE INVENTION

An ink jet aspirator is a device which produces a colinear airflow with an ink jet stream for reducing the effects of aerodynamic retardation on the stream. The aspirator is useful in all ink jet printing systems including, but not limited to, analog deflected systems and nozzle per spot systems.

Figure 1:
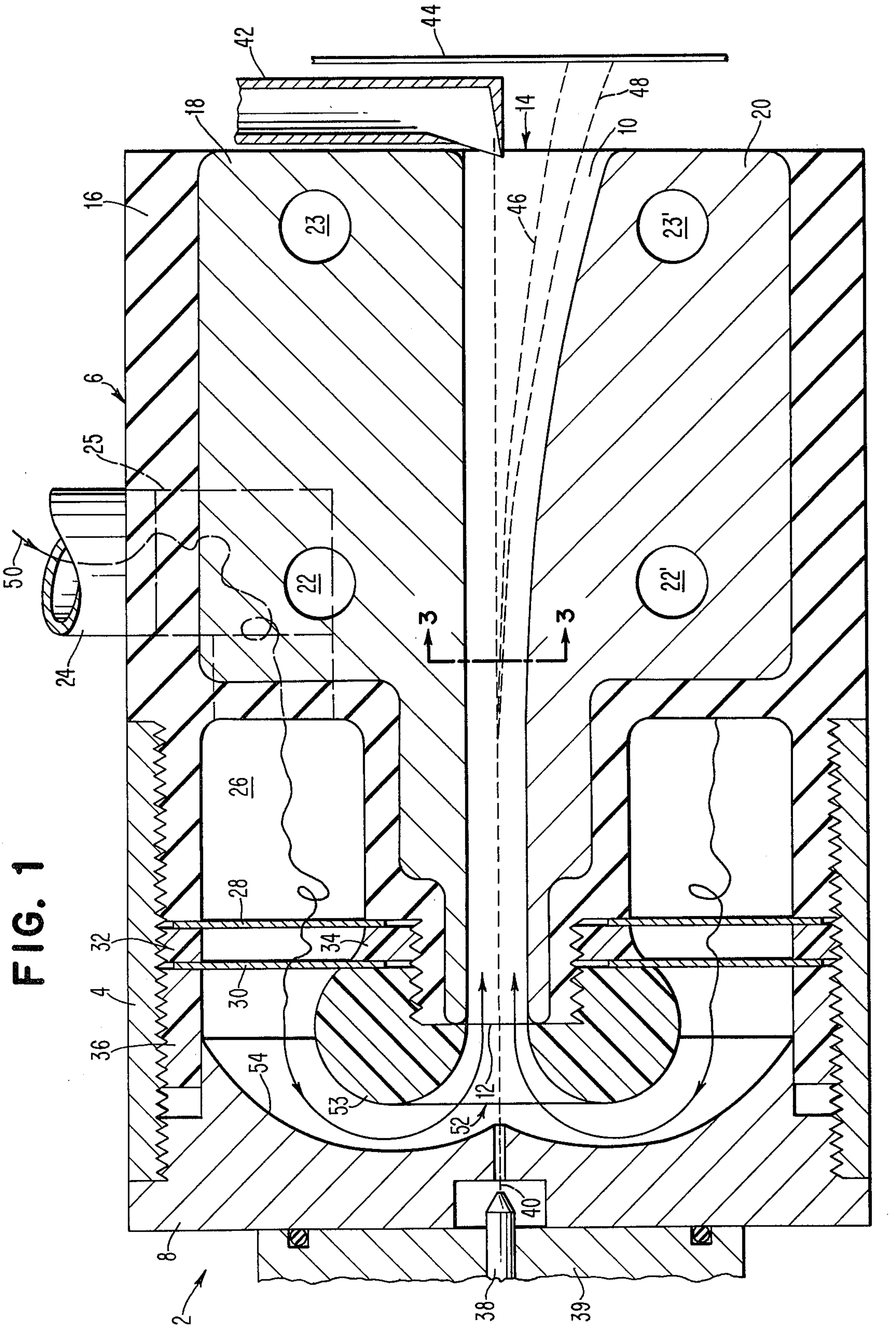
FIG. 1 is a cross-sectional view of an ink jet aspirator according to the present invention, in which the aspirator includes a tunnel which has a circular entrance aperture and a non-circular exit aperture.

In FIG. 1, a sectional view of an ink jet aspirator for an analog deflected system is illustrated generally at 2. As is known in the art, an analog deflected system is one in which charged droplets are deflected to a printing medium at an angle determined by the charge thereon. The aspirator 2 includes a housing 4, which for example, may be made of an insulator such as a ceramic or plexiglass. The housing 4 is threaded on the inside to receive at one end thereof a housing 6, which for example, may be made of an insulating material such as plexiglass, and at the other end thereof a charge electrode structure 8, which for example, may be made of a conductive material. The housing 6 includes a passageway which is termed windtunnel 10 and, which has a circular entrance aperture 12 and a non-circular exit aperture 14 which is preferably elliptical or rectangular in shape. A gasket material 16 is secured to the illustrated bottom section of the aspirator for making an airtight seal when a mirror image top section of the aspirator (not shown) is secured thereto. Deflection plates 18 and 20 are clamped between the housing 6 and its mirror image by connecting pins 22 and 23 and 22' and 23', respectively. An inlet port 24 which is connected to a gas supply (not shown) is connected to an opening in the housing 6. The opening has a porous plug 25 inserted therein. The aspirator includes a settling chamber 26 and two porous screens 28 and 30, which for example, may be woven stainless steel screens which are separated by spacers 32 and 34. A retaining ring 36 maintains the screens 28 and 30 in place against the spacer 32 and the housing 6.

An ink jet nozzle 38, which is formed in an ink jet head 39, supplies ink under pressure from a source (not shown), for directing an ink stream 40 through the tunnel 10. The ink stream droplets, which have a drop diameter on the order of 0.002 inch and which have a drop velocity on the order of 700 inch/sec., are selectively charged by the charge electrode 8. Uncharged droplets are guttered, in a gutter 42 and the other droplets are charged an amount in accordance with where they are to be deflected on a printing medium 44. This is illustrated by exemplary droplet trajectories 46 and 48. In practice, the gutter 42 is oriented such that the droplets flow therethrough in response to gravity.

The tunnel 10 is designed to have a changing cross-sectional geometry from entrance to exit to accommodate the different droplet trajectories. To maintain a constant velocity airflow through the tunnel 10, the cross-sectional area of the tunnel is designed to be substantially constant when measured from one plane to the next, when measured in any given plane transverse to the longitudinal axis of the tunnel. How the geometry of the tunnel is determined to maintain the constant cross-sectional area and changing geometry is described in detail in relation to FIG. 5.

A gas such as air, nitrogen, etc. is supplied from a gas supply pump (not shown) at a pressure on the order of 3 to 5 psi at a flow rate of 8 liters per minute, with the pressure being regulated to 0.3 psi before being applied to the inlet pipe 24, and through the porous plug 25, which functions to reduce the turbulence of the input gas flow. The gas flows in the direction of the arrow 50 into the settling chamber 26, which functions to sharply drop the mean velocity of the gas, thereby reducing the high level of turbulence of the gas. The porous screens 28 and 30 function as a gas pressure equalizing means to equalize the gas pressure around the circumference of the settling chamber and to break down the large scale turbulence into smaller eddies that are subject to viscous dissipation as the gas flow continues. The gas flow is then strongly accelerated into the windtunnel mouth 52, to a velocity on the order of 700 inches/sec. which is equal to the droplet velocity as it flows over the curvilinear surface 53 thereof, and the curvinlinear surface 54 of the charge electrode structure 8. This streamwise acceleration further decreases the turbulence level of the gas flow. The windtunnel mouth 52 is made of plexiglass, and is threaded on the housing 6 to provide a curvilinear surface adjacent the tunnel entrance 12.

Since the nozzle 38 and the charge electrode 8 do not protrude into the mouth of the windtunnel there is minimal, if any, turbulence created by these structures, as opposed to the turbulence created by like structures found in the referenced prior art.

Since, as previously explained, the windtunnel 10 has a constant cross-sectional area which changes from circular to non-circular, from entrance to exit, the mean velocity of the gas in the windtunnel is maintained substantially constant, and ideally is substantially at the same velocity as the ink droplet velocity to reduce the effects of aerodynamic retardation by eliminating, or at least substantially reducing the effects of aerodynamic drag. The maintaining of a constant gas velocity reduces the possibility of provoking boundary layer separation in the windtunnel, and the resultant introduction of turbulence in the gas flow.

It is seen that the deflection electrodes 18 and 20 are contoured to conform with the geometry of the windtunnel 10 and that the edges of the respective deflection electrodes are substantially coplanar with the tunnel walls. This deflection electrode arrangement eliminates, or at least substantially reduces, the deliterious charge buildup effects which would be produced on the tunnel walls if the electrodes were to be covered by the insulating tunnel material.

The region where the gas jet impacts the printing medium 44 is of negligible aerodynamic importance, and so is the effect of the gutter 42, since the inertia of the droplets at these points is much too large for the droplets to react significantly to the large curvature of the gas stream lines close to the impact area. This is so since the droplet aerodynamic relaxation time is much larger than the flight time through the stagnation point flow onto the paper.

Figure 2:
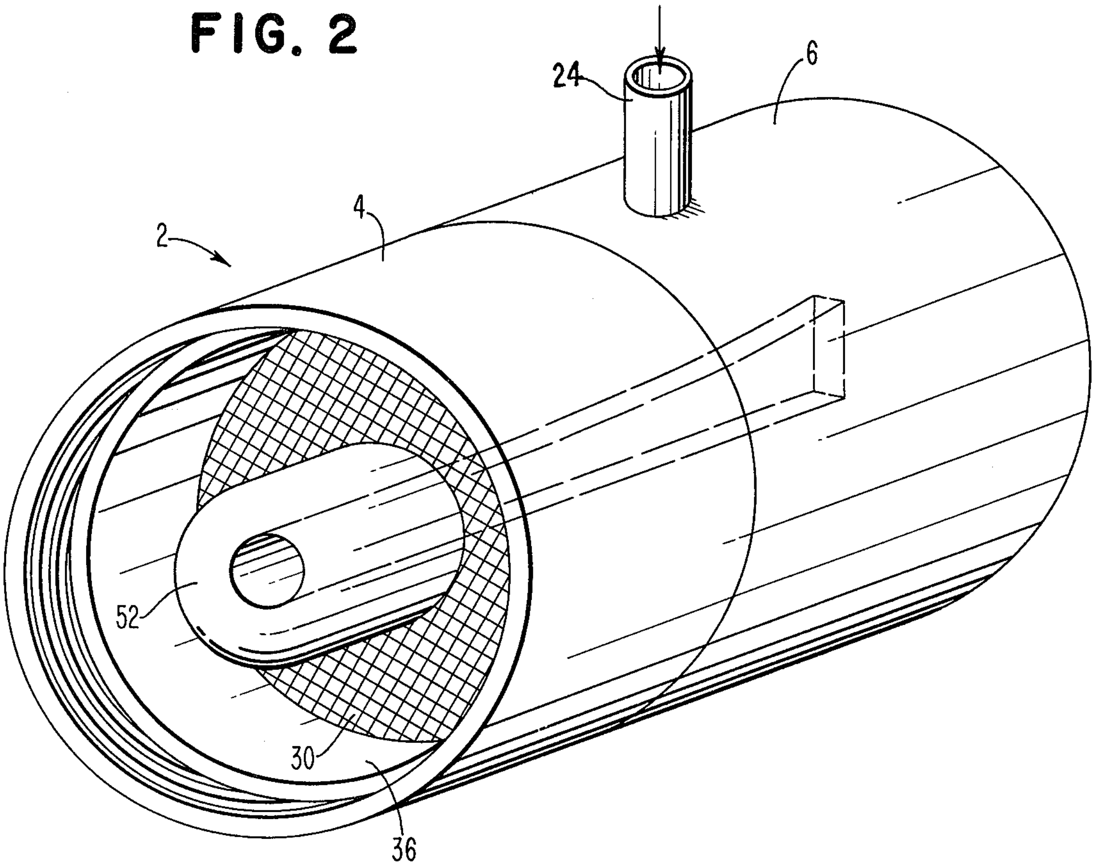
FIG. 2 is an oblique view of the aspirator as illustrated in FIG. 1, with the charge electrode absent.

Refer now to FIG. 2 which is an oblique view of the aspirator 2 which more clearly illustrates its overall physical configuration. The charge electrode 8 is not illustrated in the threaded portion of the housing 4, to more clearly illustrate the internal structure of the aspirator.

Figure 3:
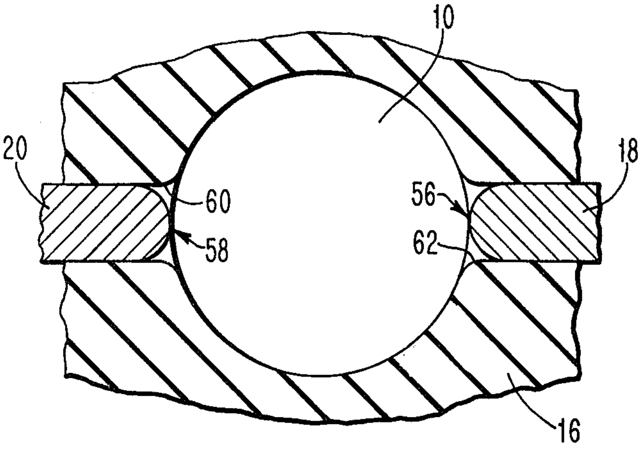
FIG. 3 is a cross-section taken along the lines 3—3 of FIG. 1, illustrating how deflection electrodes are mounted in the walls of the tunnel.

FIG. 3 illustrates a partial cross-section of the aspirator 2 illustrating how the deflection electrodes 18 and 20 are formed in the housing 16 such that they do not protrude into the tunnel 10. The deflection electrodes 18 and 20 have curved surfaces 56 and 58 such that they do not produce arcing or cause turbulence in the gas flow. The tunnel 10 has internal surfaces such as at 60 and 62 rounded off during a polishing process to further reduce chances of introducing aerodynamic disturbances.

In a nozzle per spot printing system aspiration is also needed to assure that a given droplet arrives at the printing medium at a precise time regardless of the desired droplet pattern. As is known in the art, a nozzle per spot system is one in which uncharged droplets are used for printing, and charged droplets are charged a fixed amount and guttered, or vice versa. That is, the system operates in a binary manner. This is of utmost importance in systems which utilize non-coded information (NCI), which do not lend themselves to electronic compensation techniques to compensate for aerodynamic effects. Such non-coded information systems may, for example, comprise facsimile systems.

Figure 4:
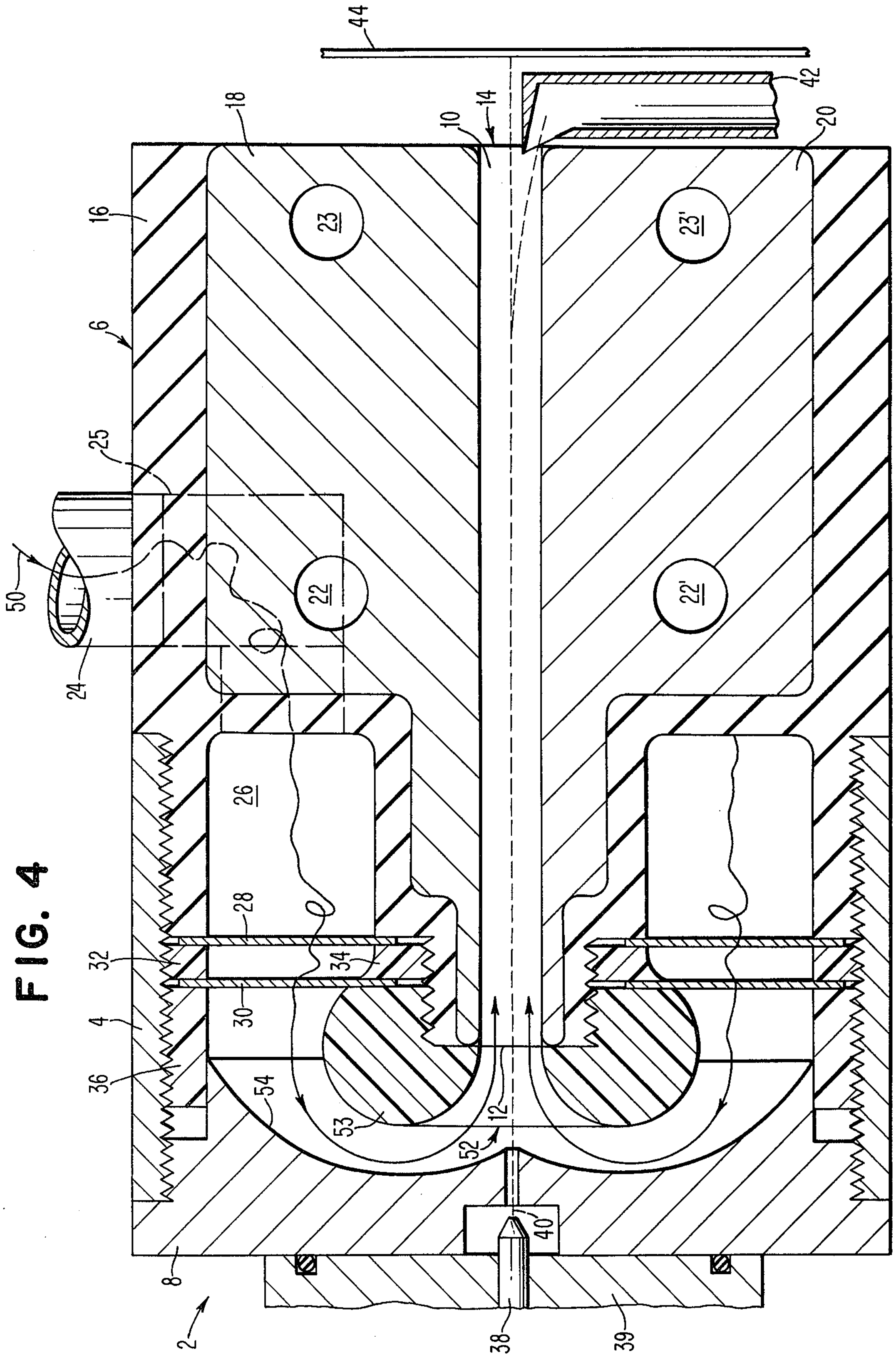
FIG. 4 is a cross-sectional view of an ink jet aspirator according to the present invention in which the geometry of the tunnel is circular in cross-section from entrance to exit.

FIG. 4 illustrates an ink jet aspirator which may be utilized in a nozzle per spot printing system. The aspirator is substantially identical to the one illustrated in FIG. 1, with like elements having the same numerical designation. The only difference is that the tunnel 10 is circular in cross-section from the entrance 12 to the exit 14, with the cross-sectional area of the tunnel being substantially constant from one plane to the next, when measured in any given plane transverse to the longitudinal axis of the tunnel. In practice, the tunnel in a nozzle per spot system is much shorter than the tunnel in an analog deflected system. As illustrated, deflected droplets are not used for printing, and the deflected droplet trajectory is substantially constant and a relatively small angular amount. Accordingly, the tunnel geometry is maintained constant from entrance to exit due to the minimal trajectory difference between deflected and undeflected droplets. However, the inlet pipe 24, the porous plug 25, the settling chamber 26, the gas pressure equalizing screens 28 and 30, and the curvilinear surfaces 53 and 54 are needed to maintain the non-turbulent gas flow into the tunnel. The constant velocity gas flow in the tunnel is again maintained by the constant cross-sectional area of the tunnel.

Figure 5:
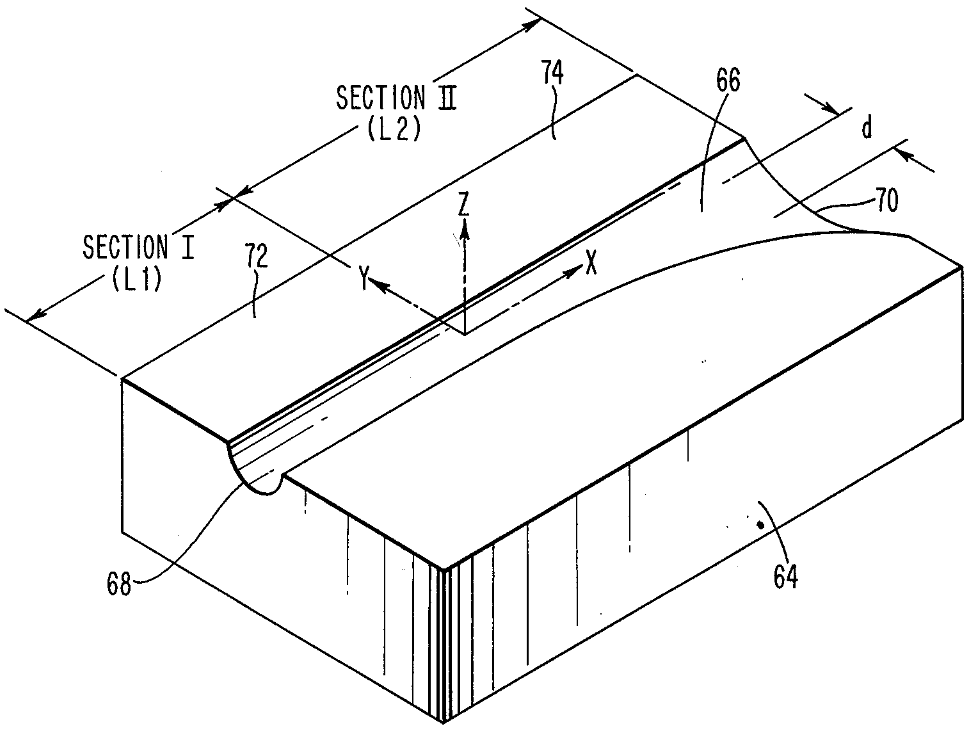
FIG. 5 is a sectional plan view of the tunnel portion of an aspirator according to the present invention, in which the entrance of the tunnel is circular in cross-section, with the geometry of the tunnel changing along its longitudinal axis to a non-circular geometry at the exit, which geometry is preferably elliptical or rectangular.

FIG. 5 is a diagrammatic illustration of how a typical windtunnel is formed in an insulating material such as a plexiglass block 64. The block 64 has a passageway such as a tunnel 66 formed therein, for example, by computer controlled milling in accordance with a predetermined set of equations as set forth shortly. As previously explained, the tunnel 66 has an entrance aperture 68 which is circular in cross-section, with the tunnel changing in geometry along its longitudinal axis to an exit aperture 70 which is non-circular in cross-section, and which is preferably elliptical or rectangular in cross-section. The block 64 is divided into a first section 72 and a second section 74. The section 72 has the portion of the tunnel 70 formed therein which is circular in cross-section, with the section 74 having the portion of the tunnel therein which changes from circular to non-circular, in this instance elliptical in cross-section.

The first section of the tunnel is described by the following equations:

(1) $y = r_c \cos \phi$ (2) $z = -r_c \sin \phi$ where:

$0 \leqq \phi \leqq \pi$;

$-L_1 \leqq x \leqq 0$;

$r_c$ = radius;

$\phi$ = angle across the circumference of the circle, i.e., the polar angle; and $L_1$ = length of first section of the tunnel.

The second section of the tunnel is described by the following equations:

$$y = \left[(a_c \cos \phi - d) - r_c \cos \phi\right]\left(\frac{x}{L_2}\right)^2 + r_c \cos \phi \qquad (3)$$

$$z = -r_c^2 \sin \phi \left[(a_c - r_c)\left(\frac{x}{L_2}\right)^2 + r_c\right]^{-1} \qquad (4)$$

where:

$0 \leqq \phi \leqq \pi$;

$0 < x \leqq L_2$;

$r_c$ = radius $a_c$ = major half axis of ellipse at the exit cross-sectional the tunnel;

$b_c$ = minor half axis of ellipse at the end of the tunnel.

$L_2$ = length of second section of the tunnel; and d = distance from center of ellipse, at the exit, to the longitudinal center axis of the tunnel.

Figure 6:
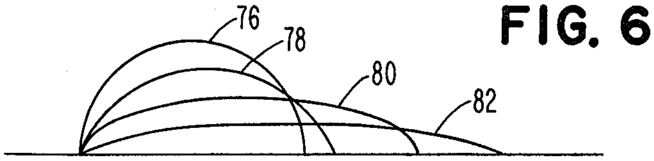
FIG. 6 illustrates successive cross-sectional views of the tunnel of FIG. 1, illustrating how the tunnel geometry changes from circular to non-circular from entrance to exit.

Refer to FIG. 6 which illustrates how the geometry of the tunnel 66 changes in succeeding cross-sections from the entrance to the exit. Curve 76 illustrates the circular cross-section of the tunnel in the section 72, with the cross-section of the tunnel in section 74 becoming more and more elliptical as illustrated by curves 78, 80 and 82. Curve 82 illustrates the cross-section of the tunnel at the end of the section 74.

Figure 7:
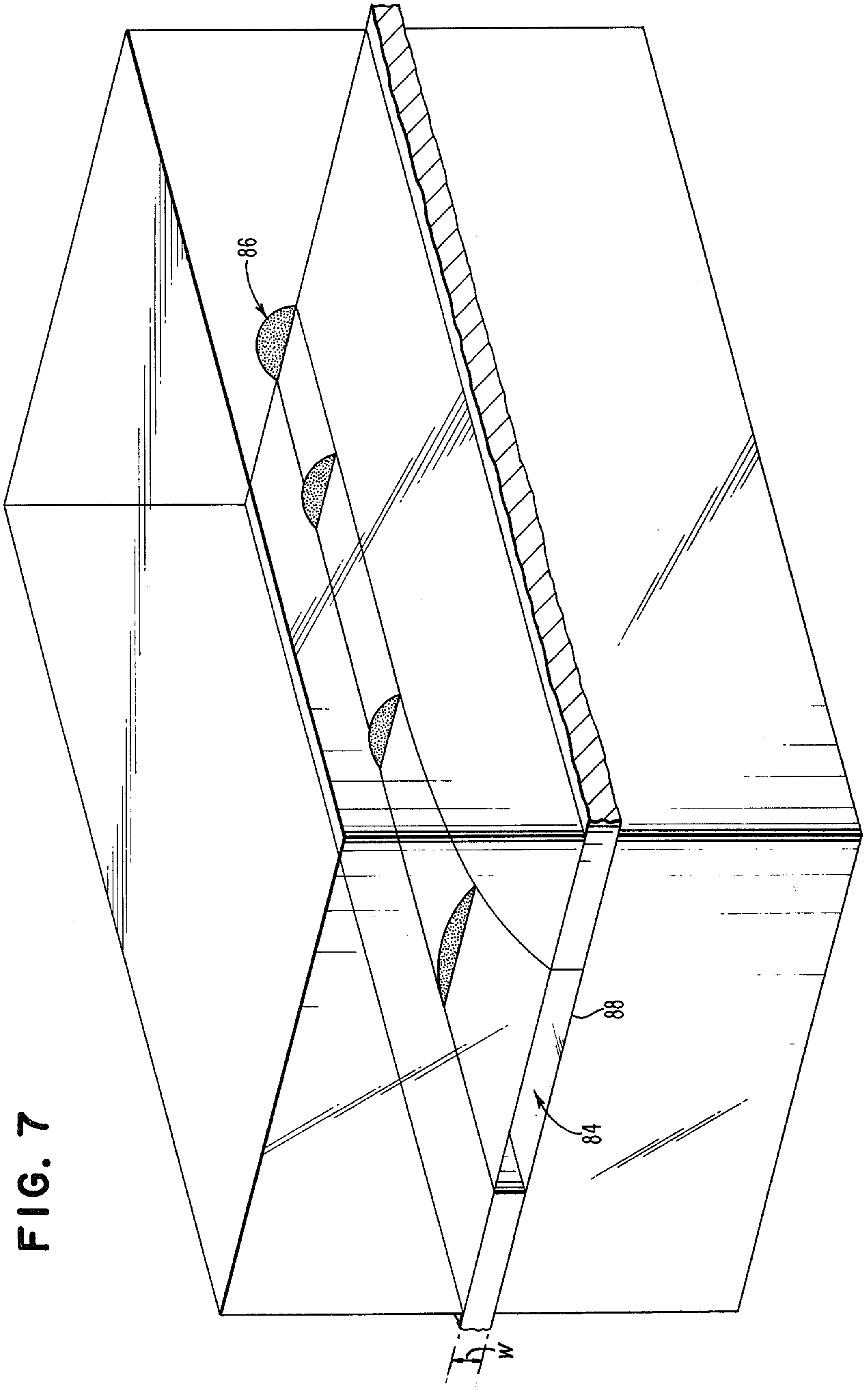
FIG. 7 is a plan view of a tunnel suitable for use in the aspirator according to the present invention, where the geometry of the tunnel is circular at the entrance and changes to rectangular at its exit.

FIG. 7 illustrates a tunnel similar to that illustrated in FIG. 5, with the difference being that the entrance 86 of the tunnel 84 is circular with the geometry of the tunnel then changing to rectangular at its exit 88. The first section of the tunnel is described by equations (1) and (2) above. The second section of the tunnel is described in the y direction by equation (3) above, and in the z direction by equation (5) below:

$$z = \left(-\frac{w}{2}\right)g(x) + r_c \sin \phi \,[g(x) - 1] \qquad (5)$$

where:

$$g(x) = \left(\frac{(A + B + C)\left(\frac{x}{L_2}\right) - C\left(\frac{x}{L_2}\right)^2}{A\left(\frac{x}{L_2}\right)^2 + B}\right)$$

$w$ = tunnel exit width as shown in FIG. 7;

$A = wa_c - (B+C+D)$ $B = wr_c - D$ $C = \pi/2 (a_c r_c) - D$ $D = \pi/2 (r_c^2)$

Figure 8:
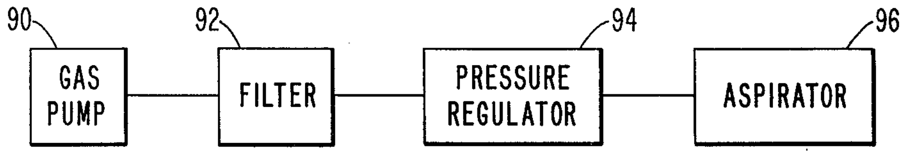
FIG. 8 is a block diagram representation of a gas supply system which may be used with the aspirator of the present invention.

FIG. 8 illustrates an exemplary system for supplying a regulated gas flow to the above-described aspirator. A gas pump 90 supplies an inert gas at a pressure on the order of 5 lbs. per square inch (psi) and a volume flow of 10 liters/min. to a filter 92 which removes contaminants from the gas. A pressure regulator 94 then regulates the gas to a pressure on the order of 0.3 psi, with the gas then being supplied to aspirator 96. As previously explained, the aspirator responds to the applied gas flow to provide a colinear gas flow in the aspirator which has a velocity on the order of 700 in/sec., which is substantially identical to the ink droplet velocity in the aspirator. Accordingly, the aerodynamic drag on the respective droplets is eliminated, or at least substantially reduced.

The described aspirator may be utilized in known ink jet printers, and for example, may be mounted with an ink jet head on a typewriter type carriage.

What is claimed is:

1. An integral ink jet aspirator comprising:
housing means having front and rear ends and including a gas inlet port;
a charge electrode enclosing the front end of said housing means, said electrode having an axial passage from an outer face to an inner face, said inner face being curvilinear;
an ink jet head on said outer face of said charge electrode in axial alignment with said axial passage in said charge electrode;
a tunnel within said housing means in axial alignment with said axial passage in said charge electrode, said tunnel having an entrance and an exit and having a substantially uniform cross-sectional area from said entrance to said exit;
a mouth at said tunnel entrance having a curvilinear surface spaced from said curvilinear surface of said charge electrode, with the space therebetween forming a channel;
turbulence decreasing means within said housing means and between said inlet port and said channel; and
deflection means in the walls of said tunnel.

2. The combination claimed in claim 1, wherein said tunnel has an entrance of one geometry, with said tunnel changing in geometry along its length to a different geometry at its exit.

3. An integral ink jet aspirator comprising:
housing means having front and rear ends and including an inlet port for receiving a pressurized gas;
a charge electrode enclosing the front end of said housing means, said electrode having an axial passage from an outer face to inner face, said inner face being curvilinear;
an ink jet head on said outer face of said electrode, including a nozzle in axial alignment with said passage for emitting an ink jet stream at a predetermined velocity which breaks up within said passage to form a droplet stream;
a tunnel within said housing means in axial alignment with said passage, said tunnel having an entrance and an exit and having a substantially uniform cross-sectional area from said entrance to said exit;
a mouth at said tunnel entrance having a curvilinear surface spaced from said curvilinear surface of said charge electrode with the space therebetween forming a channel for decreasing the turbulence of gas flow therethrough;
a gas settling chamber within said housing means and connected to said inlet port for decreasing the turbulence of received gas;
pressure equalizing means between said settling chamber and said channel for passing substantially turbulence free gas therebetween;
deflection plates recessed in a selected region of the walls of said tunnel and extending substantially from said entrance to said exit with said deflection plates following the contour of, and being substantially coplanar with the inner surface of said walls.

4. The combination claimed in claim 3, wherein said tunnel has an entrance of one geometry, with said tunnel changing in geometry along its length to a different geometry at its exit.

5. An integral ink jet aspirator comprising:
a cylindrical housing means having front and rear ends and including an inlet port for receiving a pressurized gas;
a circular charge electrode enclosing the front end of said cylindrical housing means, said electrode having an axial passage from an outer face to an inner face, said inner face being curvilinear;
an ink jet head mounted on said outer face of said electrode, including a nozzle in axial alignment with said passage for emitting an ink jet stream at a predetermined velocity which breaks up within said passage to form a droplet stream;
a tunnel within said cylindrical housing means in axial alignment with said passage, said tunnel having an entrance and an exit and having a substantially uniform cross-sectional area from said entrance to said exit for maintaining the velocity of gas flow therethrough substantially constant;
a mouth at said tunnel entrance having a curvilinear surface spaced from said curvilinear surface of said charge electrode with the space therebetween forming a channel for accelerating the flow of gas therethrough to substantially the same velocity as said droplet stream;
a gas settling chamber within said cylindrical housing means, and connected to said inlet port and surrounding a portion of said tunnel for decreasing the turbulence of received gas;
pressure equalizing means surrounding a portion of said tunnel and located between said settling chamber and said channel for passing substantially turbulence free gas therebetween; and
deflection plates recessed in a selected region of the walls of said tunnel and extending substantially from said entrance to said exit with said deflection plates following the contour of, and being substantially coplanar with the inner surface of said walls.

6. The combination claimed in claim 5, wherein said tunnel has an entrance of one geometry, with said tunnel changing in geometry along its length to different geometry at its exit.

7. An integral ink jet aspirator comprising:
an ink jet head including a nozzle;
housing means having front and rear ends, and including an inlet port for receiving a pressurized gas;
a charge electrode having one face attached to said ink jet head and the other face having a curvilinear surface enclosing the front end of said housing means, with said charge electrode having a passage therethrough which is in axial alignment with said nozzle;

a tunnel within said housing a substantially uniform cross-sectional area from entrance to exit thereof, and in axial alignment with said nozzle and the passage in said charge electrode, with said tunnel entrance including a mouth having a curvilinear surface facing and spaced from said charge electrode, with the space between the curvilinear surfaces of said charge electrode and said mouth forming a channel in said housing for decreasing the turbulence of gas flow therethrough;

deflection plates in the walls of said tunnel; and turbulence decreasing means in said housing connecting said channel and said inlet port.

8. The combination claimed in claim 7, wherein said tunnel has an entrance of one geometry, with said tunnel changing in geometry along its length to a different geometry at its exit.

9. The combination claimed in claim 8, wherein said one geometry is essentially circular, and said different geometry is non-circular.

10. The combination claimed in claim 9, wherein said non-circular geometry is elliptical.

11. The combination claimed in claim 9, wherein said non-circular geometry is rectangular.

12. The combination claimed in claim 7, wherein said turbulence decreasing means comprises:

a settling chamber formed in said housing, said settling chamber being connected to said inlet port; and pressure equalizing means formed in said housing connecting said channel and said settling chamber.

13. The combination claimed in claim 12, wherein said pressure equalizing means comprises at least one porous screen.

14. An integral ink jet aspirator comprising:

an ink jet head including a nozzle;

cylindrical housing means having front and rear ends, and including an inlet port for receiving a pressurized gas;

a charge electrode having one face sealed to said ink jet head and the other face having a curvilinear surface enclosing the front end of said cylindrical housing means, with said charge electrode having a passage therethrough which is in axial alignment with said nozzle;

a tunnel within said cylindrical housing means in axial alignment with the said nozzle and the passage in said charge electrode with the crosssectional area of said tunnel being substantially constant along its length, with said tunnel including a mouth having a curvilinear surface facing and spaced from said charge electrode, with the space between the curvilinear surfaces of said charge electrode and said mouth forming a symmetrical channel in said housing for decreasing the turbulence of gas flow therethrough;

deflection plates formed in the walls of said tunnel and which extend substantially from the entrance to the exit thereof, with said deflection plates following the contour of and being substantially coplanar with a selected region of the inner surface of said walls;

a settling chamber formed in said housing, said settling chamber being connected to said inlet port; and pressure equalizing means formed in said housing connecting said channel and said settling chamber.

15. The combination claimed in claim 14, wherein said tunnel has an entrance of one geometry, with said tunnel charging in geometry along its length to a different geometry at its exit.

16. The combination claimed in claim 15, wherein said one geometry is circular in cross section, and said different geometry is non-circular in cross section.

17. The combination claimed in claim 16, wherein said non-circular geometry is elliptical.

18. The combination claimed in claim 16, wherein said non-circular geometry is rectangular.

19. The combination claimed in claim 14 including:

a gas pump for supplying a pressurized gas;

a filter connected to said gas pump for filtering contaminants from the gas; and a pressure regulator connected to said filter for regulating the filtered gas to a desired pressure for application to said inlet port in said cylindrical housing means.

20. The combination claimed in claim 14, with said tunnel being substantially circular in cross-section.

21. The combination claimed in 14, including a porous plug in said inlet port for reducing the turbulence of the received gas.

22. The combination claimed in claim 14, wherein said housing means is formed from an insulator.

23. An integral ink jet aspirator comprising:

housing means having front and rear ends and including a gas inlet port;

a charge electrode enclosing the front end of said housing means, said electrode having an axial passage from an outer face to an inner face, said inner face being curvilinear;

an ink jet head on said outer face of said charge electrode in axial alignment with said axial passage in said charge electrode;

a tunnel within said housing means in axial alignment with said axial passage in said charge electrode, said tunnel having an entrance and an exit and having a substantially uniform cross-sectional area from said entrance to said exit;

a mouth at said tunnel entrance having a curvilinear surface spaced from said curvilinear surface of said charge electrode, with the space therebetween forming a symmetrical channel;

turbulence decreasing means within said housing means and between said inlet port and said channel; and deflection electrode means in the walls of said tunnel.

24. An integral ink jet aspirator comprising:

housing means having front and rear ends and including a gas inlet port;

a charge electrode enclosing the front end of said housing means, said electrode having an axial passage from an outer face to an inner face, said inner face being curvilinear;

an ink jet head, including means to seal said head to said outer face of said charge electrode in axial alignment with said axial passage in said charge electrode;

a tunnel within said housing means in axial alignment with said axial passage in said charge electrode, said tunnel having an entrance and an exit and having a substantially uniform cross-sectional area from said entrance to said exit;

a mouth at said tunnel entrance having a curvilinear surface spaced from said curvilinear surface of said charge electrode, with the space therebetween forming a channel;

turbulence decreasing means within said housing means and between said inlet port and said channel; and deflection plate means in the walls of said tunnel.

25. An integral ink jet aspirator comprising:

housing means having front and rear ends and including a gas inlet port;

a charge electrode enclosing the front end of said housing means, said electrode having an axial passage from an outer face to an inner face, said inner face being curvilinear;

a removable ink jet head, including means to seal said head to said outer face of said charge electrode in an air-tight manner, in axial alignment with said axial passage in said charge electrode;

a tunnel within said housing means in axial alignment with said axial passage in said charge electrode, said tunnel having an entrance and an exit and having a substantially uniform cross-sectional area from said entrance to said exit;

a doughnut-shaped mouth at said tunnel entrance spaced from said curvilinear surface of said charge electrode, with the space therebetween forming a symmetrical annular chamber;

turbulence decreasing means within said housing means and between said inlet port and said channel; and deflection plate means in the walls of said tunnel.

* * * * *